United States Patent [19]

Oshima et al.

[11] Patent Number: 5,206,299
[45] Date of Patent: Apr. 27, 1993

[54] CORE-SHELL POLYMER, RESIN COMPOSITION AND MOLDED ARTICLES THEREOF

[75] Inventors: Junji Oshima, Toyonaka; Takao Teraoka, Akashi; Minoru Yamada, Kawanishi; Shizuo Togo, Ichikawa; Goro Shimaoka, Hiratsuka; Kazuhiko Ishii, Hiratsuka, all of Japan

[73] Assignee: Takeda Chemical Industries, Ltd., Osaka, Japan

[21] Appl. No.: 851,223

[22] Filed: Mar. 16, 1992

Related U.S. Application Data

[63] Continuation of Ser. No. 501,762, Mar. 30, 1990, abandoned.

Foreign Application Priority Data

Mar. 31, 1989 [JP] Japan ................................. 1-078297

[51] Int. Cl.$^5$ ............... C08F 265/06; C08F 236/02; C08F 212/36; C08L 71/10
[52] U.S. Cl. ......................................... 525/305; 525/68; 525/309; 525/902; 106/38.2
[58] Field of Search ........................ 525/305, 309, 902

[56] References Cited

U.S. PATENT DOCUMENTS

| | | | |
|---|---|---|---|
| 3,383,435 | 5/1968 | Cizek | 260/874 |
| 3,651,177 | 3/1972 | Saito et al. | 525/310 |
| 4,393,172 | 7/1983 | Linder et al. | 525/310 |
| 4,446,277 | 5/1984 | Brandstetter et al. | 525/68 |
| 4,684,696 | 8/1987 | Bates et al. | 525/68 |
| 4,772,211 | 10/1988 | Lavengood et al. | 525/902 |

FOREIGN PATENT DOCUMENTS

| | | |
|---|---|---|
| 0034748 | 9/1981 | European Pat. Off. . |
| 0263633 | 4/1988 | European Pat. Off. . |
| 0265142 | 4/1988 | European Pat. Off. . |
| 2045938 | 3/1971 | Fed. Rep. of Germany . |
| 3149046 | 6/1983 | Fed. Rep. of Germany . |
| 52-32800 | 8/1977 | Japan . |
| 1325884 | 8/1973 | United Kingdom . |
| 1477706 | 6/1977 | United Kingdom . |

Primary Examiner—James J. Seidleck
Assistant Examiner—Vasu S. Jagannathan
Attorney, Agent, or Firm—Wenderoth, Lind & Ponack

[57] ABSTRACT

There is disclosed a core-shell polymer which comprises:

(a) a core comprising an elastomeric polymer having a glass transition temperature of not more than $-30°$ C. in an amount of 50–90% by weight;

(b) an intermediate layer comprising a polymer having a glass transition temperature of not less than 60° C. in an amount of 5–30% by weight; and (c) a shell comprising an aromatic vinyl polymer in an amount of 5–30% by weight, each based on the core-shell polymer, and the total of the core, the intermediate layer and the shell amounting to 100% by weight.

Preferably, the core is composed of polybutadiene or polyalkyl acrylate wherein the alkyl has 2–8 carbon atoms, the intermediate layer of polymethyl methacrylate and the shell of polystyrene.

A high impact polyphenylene ether resin composition is further disclosed which contains such a core-shell polymer as an impact modifier.

9 Claims, No Drawings

CORE-SHELL POLYMER, RESIN COMPOSITION AND MOLDED ARTICLES THEREOF

This application is a continuation of now abandoned application Ser. No. 07/501,762, filed Mar. 30, 1990, now abandoned.

This invention relates to a core-shell polymer, a resin composition, in particular, a polyphenylene ether resin composition, containing such a core-shell polymer as an impact modifier, and a molded resin article produced using such a resin composition.

BACKGROUND OF THE INVENTION

The polyphenylene ether resin is known as a high performance engineering thermoplastic. However, the resin has relatively high melt viscosities and softening points as well as small impact strength so that it is commercially unattractive to melt-mold the resin alone because of the required high temperatures needed to soften the resin and the problems associated therewith such as discoloration or oxidative degradation.

To solve the above problems, U.S. Pat. No. 3,383,435 discloses a resin composition composed of a polyphenylene ether resin and a rubber modified, impact resistant polystyrene such as a styrene-acrylonitrile copolymer or a styrene-acrylonitrile-butadiene copolymer. This resin composition has an improved moldability to an extent, but is still inferior in impact strength.

A resin composition is also known which contains an elastomer or rubber in addition to a polyphenylene ether resin and rubber modified polystyrene so that the resin composition has an improved impact strength. For example, there is disclosed in British Patent No. 1,477,706, a resin composition composed of a polyphenylene ether resin, a rubber modified polystyrene and a hydrogenated block copolymer of the A-B-A type wherein A is a polymerized monoalkenyl aromatic hydrocarbon block and B is a polymerized conjugated dienic hydrocarbon block in which the unsaturation of the block has been reduced to less than 10% of the original unsaturation. This resin composition also has an improved impact strength to an extent, but is still insufficient for practical application. Moreover, the resin composition has an insufficient flow.

As a generally accepted method of improving impact strength of a resin, it is known to incorporate a core-shell polymer which has, as well known in the art, a core of an elastomer and a shell of glassy polymer, into a resin as an impact modifier. The core-shell polymer is melblended with a resin, and has an advantage that it is dispersible in a resin substantially irrespectively of the conditions under which the core-shell polymer is melt-blended with the resin. However, no core-shell polymer has hitherto been known which satisfactorily improves impact strength of the polyphenylene ether resin.

For instance, a core-shell polymer having a shell composed of polymers of methacrylic acid esters and/or acrylic acid esters fails to impart satisfactory impact strength to a polyphenylene ether resin.

In turn, a polyphenylene ether resin composition is also known which contains, as an impact modifier, a core-shell polymer having a shell of aromatic vinyl polymer, as disclosed in U.S. Pat. No. 4,684,696. The core-shell polymer is allegedly composed of an acrylate core surrounded and interpenetrated by a crosslinked styrenic shell. However, it has been found out by the present inventors that the emulsion polymerization of styrene in the presence of crosslinked acrylate rubber particles in accordance with the description in the reference provides, as a matter of fact, two-phase polymer particles in which the resultant styrenic polymer is dispersed in the acrylate rubber phase to form a salami-like structure. More specifically, the resultant polymer particles have substantially no styrenic polymer on the surface, so that the polymer particles are very adhesive to each other and thus very difficult in handling. And yet the polymer fails to impart sufficient impact strength to a polyphenylene ether resin. When an increased amount of styrene is used in the production of the two-phase polymer so that the resultant polymer particles have styrenic polymers on the surface, the resultant polymer particles are useless as an impact modifier.

DETAILED DESCRIPTION OF THE INVENTION

The present inventors have made intensive invenstigations to solve the above described problems and to improve impact strength of the polyphenylene resin, and found that the provision of an intermediate layer of a polymer having a glass transition temperature (Tg) of not less than 60° C., such as polymethyl methacrylate, between an elastomeric core and a styrenic shell prevents the occurrence of the salami-like structure in the resultant core-shell polymer, thereby to improve satisfactorily impact strength of a polyphenylene ether resin.

In accordance with the invention, there is provided a core-shell polymer which comprises:

(a) a core comprising an elastomeric polymer having a glass transition temperature of not more than $-30°$ C. in an amount of 50–90% by weight;

(b) an intermediate layer comprising a polymer having a glass transition temperature of not less than 60° C. in an amount of 5–30% by weight; and (c) a shell comprising an aromatic vinyl polymer in an amount of 5–30% by weight;

each based on the core-shell polymer, and the total of the core, the intermediate layer and the shell amounting to 100% by weight.

The core-shell polymer of the invention has a core comprising an elastomeric polymer having a glass transition temperature of not more than $-30°$ C., and such an elastomeric polymer may be organosiloxane rubber, ethylene-propylene rubber, urethane rubber, dienic rubber, acrylic rubber, or a mixture of these.

The core-shell polymer of the invention may be produced advantageously by three-step, sequential seeding emulsion polymerization in such a manner that a polymer produced in a preceeding step is covered with a polymer produced in a succeeding step.

When necessary, the elastomeric polymer may be in advance separately prepared by a method other than emulsion polymerization and then emulsified for use as seeds. By way of example, a linear, an isocyanate group terminated urethane prepolymer is dissolved in a hydrophobic organic solvent such as toluene or xylene together with a small amount (usually 0.1–10% by weight) of a branched, isocyanate group terminated urethane prepolymer, and then the prepolymer solution is dispersed in an aqueous solution of an emulsifier with a homogenizer such as Manton Gaulin to form an emulsion. Then the emulsion is aged over a period from a few hours to a few days to polymerize the prepolymers making use of water as a chain extension agent. After the polymerization, the solvent is removed by, for example, distillation under reduced pressure, to provide a seeding latex of urethane rubber. Two-step, sequential seeding emulsion polymerization using this seeding latex provides a core-shell polymer having an urethane rubber core.

As a further example, an organosiloxane rubber emulsion may be prepared as follows. A solution containing a cycloorganosiloxane such as hexamethylcyclohexane trisiloxane or octamethylcyclotetrasiloxane and a small amount of polyalkoxysilane (usually 0.1–10% by weight) such as trimethoxymethylsilane or triethoxyphenylsilane is dispersed in an aqueous solution of an emulsifier such as an alkylbenzene sulfonic acid or an alkylsulfonic acid to prepare an emulsion. The emulsion is then aged over a period from a few hours to a few days to polymerize the organosiloxanes, thereby to provide a seeding latex of organosiloxane rubber. Two-step, sequential seeding emulsion polymerization using the above latex as a seeding latex provides a core-shell polymer having an organosiloxane rubber core.

However, the core-shell polymer of the invention may be produced most preferably by the following three-step, sequential seeding emulsion polymerizatione. In the first step, a conjugated diene monomer, an alkyl acrylate wherein the alkyl has 2–8 carbon atoms or a mixture thereof is emulsion polymerized to produce a core composed of an elastomertic polymer having a glass transition temperature of not more than $-30°$ C. In this first step, there may be preferably used as the conjugated diene monomer, for example, butadiene, isoprene or chloroprene, with butadiene most preferred. As the alkyl acrylate wherein the alkyl has 2–8 carbon atoms, there may be mentioned, for instance, ethyl acrylate, propyl acrylate, butyl acrylate, cyclohexyl acrylate or 2-ethylhexyl acrylate, with butyl acrylate or 2-ethylhexyl acrylate most preferred. Thus, the core is preferably composed of polybutadiene or polyalkyl acrylate wherein the alkyl has 2–8 carbon atoms such as poly(n-butyl acrylate or poly(2-ethylhexyl acrylate) or a mixture of these.

A third monomer may be copolymerized with the conjugated diene monomer and/or the alkyl acrylate in the first step. The third monomer may be exemplified by, for instance, aromatic vinyl monomers such as styrene, vinyltoluene or α-methylstyrene, vinyl cyanide monomers such as acrylonitrile or methacrylonitrile, and alkyl methacrylates such as methyl methacrylate or butyl methacrylate.

When no conjugated diene monomer is used or when a conjugated diene monomer is used in an amount of not more than 20% by weight based on the total monomer used in the first step, it is preferred that a small amount of a crosslinking monomer and/or a grafting monomer is used to obtain a core-shell polymer which, when used as an impact modifier, provides improved impact strength at low temperatures to a resin composition which will be described hereinafter. There may be mentioned as such crosslinking monomers, for example, aromatic divinyl monomers such as divinylbenzene, or alkanepolyol polyacrylates or alkanepolyol polymethacrylates such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, among which are preferred in particular butylene glycol diacrylate or hexanediol diacrylate. In turn, there may be mentioned, as such grafting monomers, for example, unsaturated carboxylic acid allyl esters such as allyl acrylate, allyl methacrylate, diallyl maleate, diallyl fumarate or diallyl itaconate, with allyl methacrylate most preferred.

These crosslinking or grafting monomers may be used in an amount of 0.01–5% by weight, preferably of 0.1–2% by weight, individually, based on the total monomers used in the first step.

The core-shell polymer of the invention contains such an elastomeric core in an amount of 50–90% by weight, preferably of 60–80% by weight. The core-shell polymer containing the core in an amount outside the above specified fails to sufficiently improve impact strength of the resultant resin composition. Further, the core-shell polymer having a glass transition temperature of more than $-30°$ C. fails to improve impact strength at low temperatures of resin compositions.

In the second step, the elastomeric core is covered with an intermediate layer composed of a polymer having a glass transition temperature of not less than 60° C. For such a purpose of the invention, there may be used monomers such as methacrylic acid esters, acrylic acid esters, carboxylic acid vinyl esters or vinyl cyanides, and in particular, the use of methyl methacrylate is preferred, optionally in combination with ethyl acrylate. In the second step also, such a crosslinking or grafting monomer may be used, if desired, in an amount of 0.01–5% by weight, preferably of 0.1–2% by weight, individually, based on the total monomers used in the second step.

The core-shell polymer of the invention contains such an intermediate layer, preferably of polymethyl methacrylate optionally with ethyl acrylate copolymerized therewith, in an amount of 5–30% by weight, preferably of 10–25% by weight. The core-shell polymer containing the intermadiate layer in an amount outside the above specified fails to sufficiently improve impact resistance of the resultant resin composition.

Finally in the third step, an aromatic vinyl monomer is polymerized to form a shell on the intermediate layer. In this third step, such an aromatic vinyl monomer as styrene, vinyltoluene, α-methylstyrene or chlorostyrene may be used, among which styrene is most preferred. The core-shell polymer of the invention contains such a shell, preferably of polystyrene, in an amount of 5–30% by weight, preferably of 10–25% by weight. The core-shell polymer containing the shell in an amount outside the above specified fails to sufficiently improve impact strength of the resultant resin composition.

After the third-step emulsion polymerization, the solid polymer product is salted out as precipitates, centrifugal dehydrated and dried, to provide a core-shell polymer in the form of granulates, flakes or powders. Spray drying of the latex is also a useful method of obtaining a core-shell polymer.

The thus obtained core-shell polymer of the invention has a core, an intermediate layer and a shell with the intermediate layer distinctly separating the core and shell. Therefore, the core-shell polymer has styrenic resin only on the surface and is not adhesive to each other to render the handling very easy.

The core-shell polymer of the invention may be used as it is, or may be processed with an extruder and a pelletizer into pellets, for use as an impact modifier.

As a further aspect of the invention, there is provided an impact resistant resin composition which comprises:
(i) a polyphenylene ether resin in an amount of 10–90% by weight; and
(ii) a styrenic resin in an amount of 90–10% by weight; each based on the total of the resins; and
(iii) the core-shell polymer in an amount of 5–40 parts by weight in relation to 100 parts by weight of the total of the resins.

More preferably, the resin composition of the invention comprises: a polyphenylene ether resin in an amount of 20–60% by weight; a styrenic resin in an amount of 80–20% by weight; and the core-shell polymer in an amount of 10–30 parts by weight in relation to 100 parts by weight of the total of the resins.

The polyphenylene ether resin used in the invention is already well known in the art, and preferably has a structural unit represented by the formula

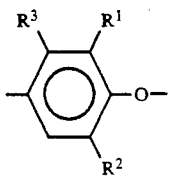

wherein $R^1$ is an alkyl of 1–3 carbon atoms, and $R^2$ and $R^3$ are independently a hydrogen or an alkyl of 1–3 carbon atoms, and may be either a homopolymer or a copolymer. More specifically, there may be mentioned as such a polyphenylene ether resin, for example, poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether or 2,6-dimethylphenol/2,3,6-trimethyl phenol copolymer, with poly(2,6-dimethyl-1,4-phenylene)ether or 2,6-dimethylphenol/2,3,6-trimethyl phenol copolymer most preferred.

The styrenic resin used in the invention is such that it contains a structural unit represented by the formula

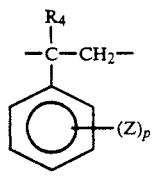

wherein $R^4$ is a hydrogen or a lower alkyl such as methyl or ethyl, Z is a halogen atom such as chlorine or a lower alkyl such as methyl or ethyl, p is 0 or an integer of from 1 to 3, in an amount of at least 25% by weight based on the styrenic resin. Thus, such a styrenic resin includes, for example, polystyrene, high impact resistant polystyrene, styrene-butadiene copolymer, styrene-butadiene-acrylonitrile copolymer, styrene-α-methyl styrene copolymer, styrene-maleic anhydride copolymer, styrene-butadiene-maleic anhydride copolymer, styrene-methyl methacrylate copolymer, ethylene-styrene copolymer and ethylene-propylene-butadiene-styrene copolymer. The high impact resistant polystyrene includes polystyrenes modified with polybutadiene, butadiene-styrene rubber or EPDM rubber.

The styrenic resin used in the invention has preferably a weight average molecular weight in the range of 3000–500,000, more preferably in the range of 3000–200,000 as measured by gel permeation chromatography.

The resin composition of the invention may contain, in addition to the core-shell polymer, an elastomer which is usually used in resin compositions containing polyphenylene resins or styrenic resins or both. Such an elastomer may be exemplified by, for example, a block copolymer of a conjugated diene and an alkenyl aromatic compound or a hydrogenated block copolymer of the A-B-A type as hereinbefore described. These elastomers are commercially available from Shell Chemical Company as Kraton O or Kraton G, respectively.

When such an elastomer is incorporated into the resin composition in conjunction with the core-shell polymer, the resin composition is designed so as to contain the total of the core-shell polymer and the elastomer in an amount of 5–40 parts by weight, preferably of 10–30 parts by weight, per 100 parts by weight of the total of the polyphenylene ether resin and the styrenic resin.

The resin composition of the invention may contain an additive or a filler known in the art such as a pigment, a thermal stabilizer, a UV adsorbing agent, a fire retardant or the like, when needed. The resin composition may be produced by a conventional method known in the art. By way of example, a polyphenylene ether resin, a styrenic resin, a core-shell polymer, and when needed, an additive or a filler are admixed and kneaded together, and extruded into pellets of a suitable size with, for instance, an extruder and a pelletizer.

The resin composition of the invention has such a high impact strength in the range from room temperatures to temperatures as low as $-40°$ C. as has not been attained by a conventional polyphenylene ether resin composition which uses a known impact modifier.

Because of their excellent properties, the resin composition of the invention have many and varied uses. For example, the resin composition can be extrusion molded, injection molded or calendered to a variety of articles or films. The resin composition may be processed together with other polymers such as polyolefins. Further, the resin composition may be used as a coating material as a solution or a suspension to any convenient substrate, or an encapsulation material. In particular, a molded article produced using the polyphenylene ether resin composition of the invention has an excellent luster while no adhesion on the surface, as well as the above mentioned high impact strength.

EXAMPLES

The invention will now be described in more detail with reference to examples, however, the invention is not limited thereto. In the following examples, the glass transition temperature is a temperature at which tan δ is maximum under tensile mode of 10 Hz in the measurement of dynamic viscoelasticity as measured with a Model VEF-3 of Iwamoto Seisakusho Co., Ltd. Weight average particle size or diameter of the core-shell polymer was measured with a Coulter Model N-4 of Coulter Electronics.

In the examples, parts and percent are by weight.

EXAMPLE 1

Production of Impact Modifier A

In a five liter capacity polymerization vessel provided with a reflux condenser, there were charged 1540 g of deionized water, 10 g of 10% aqueous solution of sodium dodecylbiphenyl ether sulfonate and 100 g of 1% aqueous solution of sodium hydrogen carbonate, and the mixture was heated to 70° C. with stirring under nitrogen. Then, 100 g of a first step monomer composition composed of 1992 g of 2-ethylhexyl acrylate, 4 g of allyl methacrylate and 4 g of 1,4-butylene glycol diacrylate were added and dispersed in the mixture in ten minutes, followed by the addition thereto of 200 g of 2% aqueous solution of sodium persulfate to initiate seeding polymerization.

The remainder (1900 g) of the first step emulsified monomer composition, with 140 g of 10% aqueous solution of sodium dodecylbiphenyl ether sulfonate, 100 g of 1% aqueous solution of sodium hydrogen carbonate and 610 g of deionized water were then added continuously over a period of three hours. The mixture was heated to 80° C. and aged at the temperature for one hour.

The mixture was then cooled to 70° C. An amount of 25 g of 2% aqueous solution of sodium persulfate was added to the mixture, and then 412.5 g of a second step emulsified monomer composition composed of 249 g of methyl methacrylate, 0.5 g of 1,4-butylene glycol diacrylate, 0.5 g of allyl methacrylate, 17.5 g of 10% aqueous solution of sodium dodecylbiphenyl ether sulfonate, 25 g of 1% aqueous solution of sodium hydrogen carbonate and 120 g of deionized water were added continuously over a period of 30 minutes to carry out the second step polymerization.

After one hour aging at 80° C., the mixture was cooled to 70° C. An amount of 25 g of 2% aqueous solution of sodium persulfate was added to the mixture, and then 412.5 g of a third step emulsified monomer composition composed of 250 g of styrene, 17.5 g of 10% aqueous solution of sodium dodecylbiphenyl ether sulfonate, 25 g of 1% aqueous solution of sodium hydrogen carbonate and 120 g of deionized water were added continuously over a period of 30 minutes to carry out the third step polymerization.

The mixture was then heated to 90° C., aged for one hour, cooled, and filtered with a 300 mesh stainless screen to provide a 44.5% solid content latex of core-shell polymer having a weight average particle size of 250 nm. The latex was spray dried at an inlet temperature of 140° C. and an outlet temperature of 70° C., to provide a core-shell polymer of 50–100 μm in particle size as an impact modifier A.

EXAMPLE 2

Production of Impact Modifier B

Ten percent aqueous solution of sodium dodecylbiphenyl ether sulfonate was used half as much as the amount used in the seeding monomer composition, the first step monomer composition and the third step monomer composition in the each steps, and otherwise in the same manner as in the Example 1, the reaction was carried out to provide a 44.3% solid content latex of core-shell polymer having a weight average particle size of 500 nm. The latex was spray dried in the same manner as in the Example 1 to provide a core-shell polymer as an impact modifier B.

EXAMPLE 3

Production of Impact Modifier C

In a two liter capacity polymerization vessel provided with a reflux condenser, there were charged 560 g of deionized water, 2 g of 1% aqueous solution of sodium dioctylsulfosuccinate and 40 g of 1% aqueous solution of sodium hydrogen carbonate, and the mixture was heated to 70° C. with stirring under nitrogen. Then, 4 g of a first step monomer composition composed of 796.4 g of n-butyl acrylate, 2.0 g of allyl maleate and 1.6 g of 1,6-hexanediol diacrylate were added and dispersed in the mixture in ten minutes, followed by the addition thereto of 80 g of 2% aqueous solution of sodium persulfate to initiate seeding polymerization.

The remainder (796 g) of the first step emulsified monomer composition, 298 g of 1% aqueous solution of sodium dioctylsulfosuccinate, 40 g of 1% aqueous solution of sodium hydrogen carbonate and 40 g of deionized water were then added continuously over a period of three hours. The mixture was heated to 80° C. and aged at the temperature for one hour.

The mixture was then cooled to 70° C. An amount of 10 g of 2% aqueous solution of sodium persulfate was added to the mixture, and then 165 g of a second step emulsified monomer composition composed of 99.5 g of methyl methacrylate, 0.3 g of allyl maleate, 0.2 g of 1,6-hexanediol diacrylate 35 g of 1% aqueous solution of sodium dioctylsulfosuccinate, 10 g of 1% aqueous solution of sodium hydrogen carbonate and 20 g of deionized water were added continuously over a period of 30 minutes to carry out the second step polymerization.

After one hour aging at 80° C., the mixture was cooled to 70° C. An amount of 10 g of 2% aqueous solution of sodium persulfate was added to the mixture, and then 165 g of a third step emulsified monomer composition composed of 100 g of styrene, 35 g of 1% aqueous solution of sodium dioctylsulfosuccinate, 10 g of 1% aqueous solution of sodium hydrogen carbonate and 20 g of deionized water were added continuously over a period of 30 minutes to carry out the third step polymerization.

The mixture was then heated to 90° C., aged for one hour, cooled, and filtered with a 300 mesh stainless screen to provide a 45.1% solid content latex of core-shell polymer having a weight average particle size of 510 nm. The latex was spray dried in the same manner as in the Example 1 to provide a core-shell polymer as an impact modifier C.

EXAMPLE 4

Production of Impact Modifier D

The seeding monomer composition and the 1% aqueous solution of sodium dioctylsulfosuccinate were used in amounts ten times as much as in the Example 3, and otherwise in the same manner as in the Example 3, the reaction was carried out to provide a 44.7% solid content latex of core-shell polymer having a weight average particle size of 290 nm. The latex was spray dried in the same manner as in the Example 1 to provide a core-shell polymer as an impact modifier D.

EXAMPLE 5

Production of Impact Modifier E

The reaction was carried out in a four liter capacity vessel provided with a reflux condenser in the same manner as in the Example 3, except that a 4% aqueous solution of sodium dioctylsulfosuccinate was used in the seeding monomer composition, the first, second and the third step emulsified monomer compositions and that deionized water was used in the seeding monomer composition in amount four times as much as the amount used in the Example 3, to provide a 44.8% solid content latex of core-shell polymer having a weight average particle size of 160 nm. The latex was spray dried in the same manner as in the Example 1 to provide a core-shell polymer as an impact modifier E.

COMPARATIVE EXAMPLE 1

Production of Impact Modifier F

The following solutions were prepared.

| Solution A: | n-butyl acrylate | 826.5 g |
| | 1,3-butylene glycol diacrylate | 1.4 g |
| Solution B: | sodium metabisulfite | 1.9 g |
| | deionized water | 30.1 g |
| Solution C: | ammonium persulfate | 5.3 g |
| | deionized water | 82.6 g |
| Solution D: | styrene | 275.7 g |
| | 55% divinylbenzene | 2.9 g |
| Solution E: | sodium lauryl sulfate | 2.3 g |
| | sodium dioctylsulfosuccinate | 4.6 g |
| | deionized water | 3806.0 g |

In a five liter capacity polymerization vessel were charged the entire amount of the solution E and 16.1 g of the solution B, and the mixture was stirred under nitrogen. An amount of 165.6 g of the solution A was added to the mixture and the mixture was heated to 55° C. Then, 14.9 g of the solution C was added to the mixture and maintained at 55° C. over a period of 1.5 hours. Thereafter, the remainder of the solution A and B, and 44.4 g of the solution C were added to the mixture, and the reaction was carried out at 55° C. for 2.5 hours, followed by cooling to 35° C.

The solution D was added to the resultant reaction mixture and stirred at 35° C. for 15 minutes, and then the mixture was raised to 60° C. The remainder of the solution D was added, and the reaction was carried out for 1.25 hours. The resultant reaction mixture was then heated to 75° C. and maintained at the temperature for 45 minutes.

After cooling, the reaction mixture was filtered with a 300 mesh stainless screen to provide a 22.1% solid content latex having a weight average particle size of 190 nm. The latex was added to a 25% solution of calcium chloride in methanol with stirring to coagulate the latex. The coagulum was filtered, washed with methanol and dried at 60° C. to provide an impact modifier F as a mass.

COMPARATIVE EXAMPLE 2

Production of Impact Modifier G

A latex was prepared in the same manner as in the Comparative Example 1 except that the solution D used contained no divinylbenzene.

The latex had a 21.9% solid content and a weight average particle size of 189 nm. The impact modifier G was obtained as a mass, not as a powder.

COMPARATIVE EXAMPLE 3

Production of Impact Modifier H

In a two liter capacity polymerization vessel provided with a reflux condenser, there were charged 560 g of deionized water, 20 g of 1% aqueous solution of sodium dioctylsulfosuccinate and 40 g of 1% aqueous solution of sodium hydrogen carbonate, and the mixture was heated to 70° C. with stirring under nitrogen. Then, 40 g of a first step monomer composition composed of 796.4 g of n-butyl acrylate, 2.0 g of allyl methacrylate and 1.6 g of 1,4-butylene glycol diacrylate were added and dispersed in the mixture in ten minutes, followed by the addition thereto of 80 g of 2% aqueous solution of sodium persulfate to initiate seeding polymerization.

The remainder (760 g) of the first step emulsified monomer composition, 280 g of 1% aqueous solution of sodium dioctylsulfosuccinate, 40 g of 1% aqueous solution of sodium hydrogen carbonate and 40 g of deionized water were then added continuously over a period of three hours. The mixture was heated to 80° C. and aged at the temperature for one hour.

The mixture was then cooled to 70° C. An amount of 20 g of 2% aqueous solution of sodium persulfate was added to the mixture, and then 320 g of a second step emulsified monomer composition composed of 200.0 g of methyl methacrylate, 60.0 g of 1% aqueous solution of sodium dioctylsulfosuccinate, 20.0 g of 1% aqueous solution of sodium hydrogen carbonate and 40.0 g of deionized water were added continuously over a period of 30 minutes to carry out the second step polymerization.

After one hour aging at 90° C., the mixture was cooled and filtered with a 300 mesh stainless screen to provide a 44.9% solid content latex of core-shell polymer having a weight average particle size of 290 nm. The latex was spray dried at an inlet temperature of 140° C. and an outlet temperature of 70° C., to provide a core-shell polymer of 50–100 μm in particle size as an impact modifier H.

The properties of the impact modifiers A to H prepared in the Examples 1–5 and the Comparative Examples 1–3 are given in the Table 1.

TABLE 1

| | Impact Modifier | $D_{av}$ of Latex (nm) | Tg of Elastomeric Layer (°C.) | Tg of Intermediate Layer (°C.) |
|---|---|---|---|---|
| Example | | | | |
| 1 | A | 250 | −56 | 120 |
| 2 | B | 500 | −56 | 120 |
| 3 | C | 510 | −39 | 119 |
| 4 | D | 290 | −39 | 118 |
| 5 | E | 160 | −39 | 119 |
| Comparative Example | | | | |
| 1 | F | 190 | −37 | 117 |
| 2 | G | 185 | −37 | 117 |
| 3 | H | 290 | −39 | 128 |

Notes: The impact modifiers A to E have a single peak formed by the intermediate layer and the shell in conjunction with each other in the measurement of viscoelasticity.
$D_{av}$: weight average particle diameter.

EXAMPLE 6

An amount of 36 parts of powder of poly(2,6-dimethyl-1,4-phenylene)ether having an intrinsic viscosity of 0.50 dl/g as measured in chloroform at 25° C., 54 parts of an impact resistant polystyrene (Dialex YH-478 from Mitsubishi Monsant K.K.) and 10 parts of the impact modifier A were admixed with a tumbler for 10 minutes, melt-bened at 290° C. with a twin screw extruder (Model PCM-30 from Ikegai Tekko K.K.) and pelletized.

The pellets were injection molded into specimens. The properties of the specimens are shown in the Table 2.

EXAMPLE 7-10

The impact modifiers B to E prepared in the Examples 2-5 were used, and otherwise in the same manner as in the Example 6, specimens were prepared. The properties of the specimens are shown in the Table 2.

EXAMPLE 11

An amount of 36 parts of powder of poly(2,6-dimethyl-1,4-phenylene)ether having an intrinsic viscosity of 0.50 dl/g as measured in chloroform at 25° C., 54 parts of a general use polystyrene (Dialex HF-77 from Mitsubishi Monsant K.K.) and 10 parts of the impact modifier A were admixed with a tumbler for 10 minutes, melt-blended at 290° C. with a twin screw extruder (Model PCM-30 from Ikegai Tekko K.K.) and pelletized.

The pellets were injection molded into specimens. The properties of the specimens are shown in the Table 2.

EXAMPLE 12

An amount of 15 parts of the impact modifier A and 5 parts of Kraton G-1651 were used, and otherwise in the same manner as in the Example 1, specimens were prepared. The properties of the specimens are shown in the Table 2.

COMPARATIVE EXAMPLES 4-6

The impact modifiers F, G and H were used, respectively, in place of the impact modifier A, and otherwise in the same manner as in the Example 6, specimens were prepared. The properties of the specimens are shown in the Table 2.

and an alkyl methacrylate, in an amount of 50-90% by weight;
(b) an intermediate layer comprising a polymer having a glass transition temperature of not less than 60° C. in an amount of 5-30% by weight; and
(c) a shell consisting essentially of an aromatic vinyl polymer in an amount of 5-30% by weight,
each based on the core-shell polymer, and the total of the core, the intermediate layer and the shell amounting to 100% by weight.

2. The core-shell polymer as claimed in claim 1 which comprises 60-80% by weight of the core, 10-25% by weight of the intermediate layer and 10-25% by weight of the shell, each based on the core-shell polymer, the total amounting to 100% by weight.

3. The core-shell polymer as claimed in claim 1 wherein the core is composed of poly(n-butyl acrylate) or poly(2-ethylhexyl acrylate).

4. The core-shell polymer as claimed in claim 1 wherein the intermediate layer is composed of poly(methyl methacrylate) optionally with ethyl acrylate copolymerized therewith.

5. The core-shell polymer as claimed in claim 1 wherein the shell is composed of polystyrene.

6. A core-shell polymer as claimed in claim 1 wherein the core is the alkyl acrylate polymer or the copolymer of an alkyl acrylate monomer which is crosslinked and/or grafted with a crosslinking monomer and/or a grafting monomer.

7. A core-shell polymer as claimed in claim 6, wherein the crosslinking monomer is selected from the group consisting of an aromatic divinyl monomer, an alkanepolyol polyacrylate or an alkanepolyol polymethacrylate.

TABLE 2

| | Examples | | | | | | | Comparative Examples | | |
|---|---|---|---|---|---|---|---|---|---|---|
| | 6 | 7 | 8 | 9 | 10 | 11 | 12 | 4 | 5 | 6 |
| Resin Compositions[1] | | | | | | | | | | |
| PPE[2] | 36 | 36 | 36 | 36 | 36 | 36 | 36 | 36 | 36 | 36 |
| HIPS[3] | 54 | 54 | 54 | 54 | 54 | 0 | 0 | 54 | 54 | 54 |
| GPPS[4] | 0 | 0 | 0 | 0 | 0 | 44 | 44 | 0 | 0 | 0 |
| Impact Modifier | | | | | | | | | | |
| Used | A | B | C | D | E | A | A | F | G | H |
| Amount | 10 | 10 | 10 | 10 | 10 | 20 | 15 | 10 | 10 | 10 |
| Kraton G-1651 | 0 | 0 | 0 | 0 | 0 | 0 | 5 | 0 | 0 | 0 |
| Properties of Resin Compositions | | | | | | | | | | |
| Izod Impact Strength (notched ¼") (Kg · cm/cm) | | | | | | | | | | |
| 23° C. | 36 | 31 | 28 | 28 | 28 | 40 | 53 | 25 | 23 | 20 |
| 0° C. | 30 | 23 | 20 | 21 | 20 | 35 | 45 | 18 | 16 | 15 |
| −20° C. | 20 | 18 | 16 | 16 | 17 | 20 | 28 | 15 | 14 | 12 |
| −40° C. | 19 | 17 | 15 | 16 | 15 | 18 | 20 | 11 | 12 | 8 |
| Flexural Strength (Kg/cm$^2$) | 750 | 750 | 740 | 740 | 770 | 750 | 710 | 750 | 720 | 710 |
| Flexural Modulus (Kg/cm$^2$) | 21800 | 22000 | 21500 | 21500 | 22000 | 22000 | 21500 | 21500 | 21500 | 21000 |
| Thermal Distortion Temperature (°C.) (18.6 Kg/cm$^2$) | 119 | 118 | 119 | 119 | 119 | 118 | 117 | 121 | 118 | 117 |

Notes:
[1] parts by weight
[2] polyphenylene ether resin
[3] high impact polystyrene
[4] general use polystyrene

What is claimed is:

1. A core-shell polymer which comprises:
   (a) a core consisting essentially of a member selected from the group consisting of (i) alkyl acrylate polymer wherein the alkyl has 2-8 carbon atoms, and (ii) a copolymer of an alkyl acrylate monomer wherein the alkyl has 2-8 carbon atoms with a monomer selected from the group consisting of an aromatic vinyl monomer, a vinyl cyanide monomer 8. A core-shell polymer as claimed in claim 6 wherein the grafting monomer is an unsaturated carboxylic acid allyl ester.

9. A core-shell polymer as claimed in claim 6 wherein the crosslinking monomer and/or grafting monomer is used in an amount of 0.01-5% by weight, individually, based on the total monomers used for the preparation of the core.

* * * * *